United States Patent [19]

Kurps et al.

[11] Patent Number: 4,645,568
[45] Date of Patent: Feb. 24, 1987

[54] PREPARATION OF CONCENTRATED, STABLE WATER-IN-OIL EMULSIONS OF WATER-SOLUBLE OR WATER-SWELLABLE POLYMERS

[75] Inventors: Armin Kurps, Boehl-Iggelheim; Hermann Fischer, Limburgerhof; Jürgen Hartmann, Ludwigshafen; Heinrich Hartmann, Limburgerhof, all of Fed. Rep. of Germany

[73] Assignee: BASF Aktiengesellschaft, Fed. Rep. of Germany

[21] Appl. No.: 753,782

[22] Filed: Jul. 11, 1985

[30] Foreign Application Priority Data

Jul. 14, 1984 [DE] Fed. Rep. of Germany ....... 3426080

[51] Int. Cl.⁴ ................................. C07B 5/00
[52] U.S. Cl. ......................... 203/14; 203/52; 203/68; 203/69; 203/70; 203/91; 523/332; 524/801; 524/827; 524/831
[58] Field of Search ............... 523/332; 524/801, 827, 524/831; 203/52, 68, 69, 70, 91

[56] References Cited

U.S. PATENT DOCUMENTS

| | | | |
|---|---|---|---|
| 3,278,506 | 10/1966 | Chamot et al. | 524/827 |
| 4,021,399 | 5/1977 | Hunter et al. | 524/801 |
| 4,052,353 | 10/1977 | Scanley | 524/555 |
| 4,090,992 | 5/1978 | Scanley | 524/801 |
| 4,105,510 | 8/1978 | Tago et al. | 203/14 |
| 4,176,107 | 11/1979 | Buckman et al. | 523/332 |
| 4,376,850 | 3/1983 | Sanner | 524/827 |
| 4,435,528 | 3/1984 | Domina | 523/332 |

FOREIGN PATENT DOCUMENTS 1277577  6/1972  United Kingdom ............... 524/801

*Primary Examiner*—Joseph L. Schofer
*Assistant Examiner*—J. M. Reddick
*Attorney, Agent, or Firm*—Oblon, Fisher, Spivak, McClelland & Maier

[57] ABSTRACT

Concentrated, stable water-in-oil emulsions of water-soluble or water-swellable polymers are prepared by polymerization of one or more water-soluble ethylenically unsaturated monomers in a water-in-oil emulsion and removal of water from the water-in-oil polymer emulsion by azeotropic distillation, by a method in which superheated vapor of an inert organic solvent which is immiscible with water is passed into the water-in-oil polymer emulsion. Using the process, it is also possible to concentrate emulsions which tend to coagulate or water-in-oil emulsions which are sensitive to shearing, without the polymers losing their effectiveness.

8 Claims, No Drawings

PREPARATION OF CONCENTRATED, STABLE WATER-IN-OIL EMULSIONS OF WATER-SOLUBLE OR WATER-SWELLABLE POLYMERS

U.S. Pat. No. 4,052,353 has disclosed a process for the preparation of a water-containing, stable, self-invertable water-in-oil polymer emulsion, in which the water content of a water-in-oil polymer emulsion is reduced to less than 40, preferably from 1 to 10, % by weight, based on the polymer and water, and a water-soluble surfactant is then added. The water content of the polymer emulsion is reduced by distilling off water and oil from the emulsion, preferably under reduced pressure. However, when this process is carried out on an industrial scale, the evaporation apparatuses become covered with polymer coatings. Moreover, the water-in-oil polymer emulsions which have been distilled are found to be less effective than the undistilled polymer emulsions.

In order to avoid the above disadvantages when concentrating water-in-oil polymer emulsions, German Pat. No. 3,206,730 discloses a process in which water is removed azeotropically from a water-in-oil polymer emulsion by exposure to microwaves. The disadvantages of this procedure are that only relatively thin layers (not thicker than 10 cm) can reasonably be used industrially, the capital costs for the evaporator capacity to be installed are extremely high, problems with regard to operational safety are to be expected, and the provision of the heat required for evaporation by means of microwave energy is very expensive.

it is an object of the present invention to provide a process for the preparation of concentrated, stable water-in-oil emulsions of water-soluble or water-swellable polymers by azeotropic removal of water from water-in-oil polymer emulsions, which process is economical and can be carried out safely industrially, and in which the effectiveness of the polymers is retained and no coatings are formed on the evaporation apparatuses.

We have found that this object is achieved, in accordance with the invention, if water is removed azeotropically from the water-in-oil polymer emulsion by passing in superheated vapor of an inert organic solvent.

Water-in-oil emulsions of water-soluble or water-swellable polymers are known. They are prepared by polymerization of one or more water-soluble ethylenically unsaturated monomers in a water-in-oil emulsion in the presence of water-in-oil emulsifiers and polymerization initiators which decompose to form free radicals under the polymerization conditions. The principle of this process is disclosed in, for example, German Pat. No. 1,089,173. Water-in-oil polymer emulsions of this type contain not more than 40, as a rule only from 25 to 30, % by weight of polymer. It is therefore necessary in practice to concentrate relatively dilute water-in-oil polymer emulsions by azeotropic removal of water.

The water-in-oil polymer emulsions may contain homopolymers or copolymers which are finely dispersed in a water-immiscible liquid, the particle sizes of the polymers being from 0.01 to 10 um. Examples of suitable water-soluble monoethylenically unsaturated compounds are monoethylenically unsaturated carboxylic acids of 3 to 6 carbon atoms, their amides and aminoalkyl esters, and maleic anhydride. Specific examples of compounds of this type are acrylic acid, methacrylic acid, itaconic acid, fumaric acid, crotonic acid, acrylamide and itaconamide. The ethylenically unsaturated carboxylic acids can be employed as the free acid or in partially or completely neutralized form. Particularly industrially important aminoalkyl esters of the ethylenically unsaturated carboxylic acids are the di-$C_1$-$C_3$-alkylamino-$C_2$-$C_5$-alkyl esters of acrylic acid and of methacrylic acid. The aminoalkyl esters are used as salts or quaternary compounds in the polymerization. For salt formation, the aminoalkyl esters are neutralized with acids, such as hydrochloric acid, sulfuric acid, phosphoric acid or acetic acid. In order to prepare the quaternary compounds, they are reacted with a quaternizing agent, eg. methyl chloride, dimethyl sulfate, lauryl chloride or benzyl chloride. Partially neutralized or partially quaternized or completely neutralized and quaternized basic monomers can be employed in the polymerization. Examples of aminoalkyl esters are dimethylaminoethyl acrylate, diethylaminoethyl acrylate, dimethylaminoethyl methacrylate, diethylaminopropyl acrylate, diethylaminopropyl methacrylate, dimethylaminobutyl acrylate, diethylaminoneopentyl acrylate, dimethylaminoneopentyl acrylate, dimethylaminoneopentyl methacrylate and diethylamnioneopentyl methacrylate. Basic (meth)acrylamides in neutralized or quaternized form may likewise be employed, eg. dimethylaminopropylacrylamide, dimethylaminopropylmethacrylamide etc.

Other monomers are the alkali metal or ammonium salts of vinylbenzylsulfonic acids, acrylamidopropanesulfonic acids and vinylsulfonic acid.

Of particular industrial importance are the homopolymers of acrylamide, acrylic acid, methacrylic acid, dimethylaminoethyl acrylate, dimethylaminoethyl methacrylate, dimethylaminoneopentyl acrylate and dimethylaminoneopentyl methacrylate, and copolymers of acrylamide, methacrylamide, acrylic acid and methacrylic acid with other water-soluble ethylenically unsaturated compounds. Copolymers of acrylamide and acrylic acid, acrylamide and methacrylic acid, acrylamide and dimethylaminoethyl acrylate, and acrylamide and dimethylaminoethyl methacrylate, and amphoteric copolymers of acrylamide, dimethylaminoethyl acrylate and acrylic acid are particularly important.

The copolymers may furthermore contain, as copolymerized units, as much as 20% by weight of other ethylenically unsaturated monomers which are insoluble or sparingly soluble in water, eg. acrylates and methacrylates of monohydric alcohols of 1 to 12 carbon atoms, acrylonitrile, methacrylonitrile, vinyl esters, eg. vinyl acetate, vinyl propionate and vinyl butyrate, diisobutylene and styrene.

To prepare polymers which swell in water, the water-soluble monomers described above are polymerized together with as much as 1% by weight of ethylenically unsaturated monomers which contain 2 or more ethylenically unsaturated double bonds in the molecule, eg. divinyldioxane, divinylbenzene, N,N'-methylenebisacrylamide and polyallyl ethers of pentaerythritol or sugars, such as pentaerythritol triallyl ether and pentaallylsucrose. The preparation of water-in-oil emulsions of water-soluble or water-swellable polymers is known, as is the fact that stable water-in-oil polymer dispersions are obtained if the polymerization of the water-in-oil monomer emulsion is furthermore carried out in the presence of from 0.1 to 10% by weight of a wetting agent having an HLB value of above 10.

Preferably, hydrophobic organic solvents, eg. toluene, xylene, perchloroethylene, trichloroethylene, tetrachloroethane and liquid aliphatic hydrocarbons, such as paraffin oils, are used as the oil phase of the polymer emulsions. Of particular practical importance are hydrocarbons whose boiling point under atmospheric pressure is from 120° to 300° C. Pure hydrocarbons or mixtures of 2 or more hydrocarbons may be used, mixtures of saturated hydrocarbons containing as much as 20% by weight of naphthenes preferably being employed. The saturated hydrocarbons are n- and i-paraffins, and the mixture boils at from 192° to 254° C. (determined according to ASTM-) 1078/86).

In order to concentrate the water-in-oil emulsions obtained by polymerization and containing water-soluble or water-swellable polymers by the process according to the invention, superheated vapor of an inert organic solvent is passed, as a heat transfer medium, into the polymer emulsion, and water and solvent are distilled off azeotropically from the said emulsion. The solvent passed, in the form of superheated vapor, into the water-in-oil polymer emulsion preferably consists of hydrocarbons which boil at from 100° to 300° C. under atmospheric pressure. The composition of the hydrocarbons, which are used as a heat transfer medium, can correspond to the composition of the oil phase of the water-in-oil polymer emulsion. Other heat transfer media which can be employed are alcohols, ethers and ketones which boil in the temperature range stated above, are virtually immiscible with water and do not have an adverse effect on the stability of the water-in-oil polymer emulsion, eg. hexanol, n-butanol, isobutanol, butyl ether and cyclohexanone.

The heat transfer medium is heated to a temperature which is from 50° to 200° C. above the boiling point of the solvent under normal pressure. The superheated solvent vapor used as the heat transfer medium is at from 150° to 350° C., preferably from 170° to 250° C. and is passed directly into the water-in-oil polymer emulsion, which advantageously has been heated to the boiling point before the beginning of the azeotropic distillation. The azeotrope distilled off from the water-in-oil polymer emulsion is condensed in a heat exchanger, and the condensate thus obtained is then passed into a separator, in which the aqueous phase is separated from the organic phase. The organic phase can, if necessary after fractionation, be re-used for obtaining superheated solvent vapor for the azeotropic distillation. Usually, this procedure is carried out by completely vaporizing the solvent in a pressure vessel and superheating the solvent vapour therein. The superheated solvent vapor is then let down, and passed into the water-in-oil emulsion.

Depending on the oil phase used in the water-in-oil emulsion and on the particular heat transfer medium employed, the azeotropic removal of the water can be carried out under atmospheric, superatmospheric or reduced pressure. For the preparation of concentrated water-in-oil polymer emulsions which contain heat-sensitive polymers, the distillation is preferably carried out under reduced pressure so that the polymers are not damaged by heat. The process is particularly useful for concentrating water-in-oil polymer emulsions which are sensitive to shearing. No coatings are formed in the distillation vessel during the azeotropic distillation, and the effectiveness of the polymers is retained. The azeotropic distillation is complete when the desired polymer concentration has been reached. The polymer concentrations are from 40 to 75, preferably from 50 to 60, % by weight, based on the total emulsion. The water content of the water-in-oil polymer emulsion is reduced to less than 10, preferably less than 5, % by weight, based on the total emulsion.

If the water-in-oil dispersions to be concentrated are sensitive to shearing or readily tend to coagulate, the amount of oil phase in the water-in-oil polymer emulsion is first increased before the beginning of the azeotropic distillation, by adding an inert water-immiscible organic solvent. This is preferably the same solvent which also constitutes the oil phase of the water-in-oil polymer emulsion. However, another inert organic solvent may also be used. The amount of the oil phase of the water-in-oil polymer emulsion is increased from 2-fold to 6-fold in the critical cases described above. By means of this measure, it is possible substantially to suppress coagulation, if it occurs at all during azeotropic removal of water, and also to concentrate particularly sensitive water-in-oil polymer emulsions without loss of effectiveness.

Another measure for stabilizing the water-in-oil polymer emulsions consists in adding a wetting agent to the polymer emulsion before the azeotropic removal of water, or, if the polymer emulsions already contain a wetting agent (for example according to German Pat. No. 2,432,699), adding further wetting agent or a different one. In this manner, the water-in-oil polymer emulsions obtained are self-inverting when poured into water. In this case, the polymers dissolve rapidly in water, and an oil-in-water emulsion is formed. For reasons relating to environmental protection, and for cost reasons, it is desirable for the water-in-oil polymer emulsions to contain very little oil and have a high polymer concentration. Self-inverting water-in-oil polymer emulsions are also obtained if a wetting agent is added to the water-in-oil polymer emulsion after the azeotropic removal of water. Suitable wetting agents are surfactants whose HLB value is above 10. The water-in-oil polymer emulsions which have been concentrated can contain from 1 to 10% by weight of a wetting agent or of a mixture of several wetting agents.

In the Examples, parts and percentages are by weight. The K values of the polymers were measured according to H. Fikentscher, Zellulosechemie 13 (1932), 58–64 and 71–74, in 5% strength aqueous sodium chloride solution at 25° C. and at a polymer concentration of 0.5% by weight; $K = k \times 10^3$. The HLB value is based on the definition by W. C. Griffin, J. Soc. Cosmet. Chem. 1 (1949), 311.

Preparation of the starting emulsions

The components of the oil phase which are shown in Table 1 were mixed in a container provided with a stirrer, a thermometer, a nitrogen inlet and a nitrogen outlet. The aqueous monomer phase, whose composition is likewise shown in Table 1, was added to this mixture, while stirring. Nitrogen was passed through the emulsion for 30 minutes, after which a solution of the initiator in a little acetone was added, and the reaction mixture was heated to 50°–60° C. and kept within this range during the 2-hour polymerization. Thereafter, the same amount of initiator was added once again, and the mixture was then kept at 65° C. for a further 2 hours. In all cases, the resulting water-in-oil polymer emulsions were free from coagulate and stable to settling out. Their composition is shown in Table 2 under starting emulsion.

TABLE 1

| Preparation of the starting emulsions | | A | B | C | D |
|---|---|---|---|---|---|
| Aqueous phase: | | | | | |
| Distilled water | [g] | 415 | 334 | 256 | 419 |
| Acrylamide | [g] | 161 | 227 | 100 | 160 |
| 37.5% strength sulfuric acid | [g] | 54 | 74 | 181 | — |
| Diethylaminoethyl acrylate | [g] | 70 | 95 | 233 | — |
| Acrylic acid | [g] | — | — | — | 70 |
| 50% strength sodium hydroxide solution | [g] | — | — | — | 79 |
| Formic acid | [g] | 0.125 | 0.52 | 0.10 | 0.125 |
| Oil phase: | | | | | |
| Hydrocarbon mixture[1] | [g] | 240 | 230 | 200 | 227 |
| Emulsifier[2] | [g] | — | 30 | 20 | — |
| Sorbitan monooleate | [g] | 45 | — | — | 35 |
| Nonylphenol with 10 moles of ethylene oxide | [g] | 15 | 10 | 10 | 10 |
| 2,2'-Azobisisobutyronitrile | [g] | 2 × 0.125 | — | — | 2 × 0.125 |
| 2,2'-Azobis(2,4-dimethylvaleronitrile) | [g] | — | — | 2 × 0.100 | — |
| 2,2'-Azobis(2-amidinopropane) hydrochloride | [g] | — | 2 × 0.086 | — | — |
| K value | | 220 | 219 | 210 | 267 |

[1]Mixture of 84% of saturated aliphatic hydrocarbons and 16% of naphthenic hydrocarbons, boiling range 192-254° C.
[2]Reaction product of 1 mole of oleyl glycidyl ether, 1 mole of glycerol and 2 moles of ethylene oxide, prepared according to German Laid-Open Application DOS 2,557,324

EXAMPLES 1-5

The starting emulsions A to D shown in Table 2 were initially taken in a heatable vessel and heated to the temperature at which the azeotropic distillation was carried out. The superheated solvent vapor used as the heat transfer medium was passed directly into the water-in-oil polymer emulsion and then let down. The heat transfer medium used in each case was an aliphatic hydrocarbon mixture having a boiling range of from 140° to 170° C. The vapors were condensed in a heat exchanger, and the condensate thus obtained was then separated into an aqueous phase and an organic phase in a separator. The azeotropic distillation was carried out initially under 30 mbar and at a boiling point of 30° C. Toward the end of the azeotropic distillation, the pressure was reduced to 20 mbar and the bottom temperature was brought to 70° C. When the desired polymer concentration in the water-in-oil polymer emulsion had been reached, the supply of superheated solvent vapor was stopped, the emulsion was cooled, the pressure was equilibrated and the emulsion was removed from the vessel. The concentrated water-in-oil polymer emulsions obtained in the azeotropic distillation were coagulate-free and dissolved rapidly when poured into water, with inversion of the phases. The polymers are effective flocculants. In no case was the polymer found to be damaged. The k values, charge densities and efficiencies of the dilute water-in-oil polymer emulsions corresponding to those of the concentrated ones within the error limits.

TABLE 2

| Composition of the water-in-oil polymer emulsions | | | | | | |
|---|---|---|---|---|---|---|
| Example | | 1 | 2 | 3 | 4 | 5 |
| (a) Starting emulsion | | A | B | C | C¹ | D |
| Polymer | [%] | 25 | 35 | 40 | 20 | 25 |
| Water | [%] | 45 | 38 | 37 | 17.5 | 47.5 |
| Hydrocarbon mixture | [%] | 24 | 23 | 20 | 60 | 23 |
| Emulsifiers | [%] | 6 | 4 | 3 | 2.5 | 4.5 |
| (b) After the azeotropic distillation | | | | | | |
| Temperature of the superheated solvent vapor | | | | 200° C. | | |
| Boiling point of the azeotrope under 30 mbar | | | | 27° C. | | |
| End product: | | | | | | |
| Polymer | [%] | 45.3 | 64.2 | 54.9 | 39.8 | 52.6 |
| Water | [%] | 1.0 | 1.1 | 1 | 1.9 | 0.7 |
| Hydrocarbon mixture | [%] | 42.8 | 27.4 | 40.85 | 53.3 | 37.2 |
| Emulsifier | [%] | 10.9 | 7.3 | 4.1 | 5.0 | 9.5 |

TABLE 2-continued

| Composition of the water-in-oil polymer emulsions | | | | | |
|---|---|---|---|---|---|
| Example | 1 | 2 | 3 | 4 | 5 |
| K values | 215 | 220 | 208 | 208 | 264 |

¹Prepared by diluting the starting emulsion C with an aliphatic cut having a boiling range of 140-170° C.

COMPARATIVE EXAMPLE 1

The starting emulsions C and C⁽¹⁾ were introduced, with the aid of a gear pump and via a pressure-regulating valve, into a Sambay evaporator operated under from 50 to 100 mbar. The wall temperatures were brought to 50°-85° C. In both cases, the lower distributor blades of the evaporator and the walls of the heating tube were found to stick. During metering by means of the gear pump alone, the starting emulsions did not show any change in stability.

COMPARATIVE EXAMPLE 2

The water-in-oil polymer emulsion C was metered, with the aid of a gear pump and via a pressure regulating valve and a distributor head, into a falling film evaporator which had been brought to an internal pressure of from 30 to 80 mbar. The temperature of the evaporator wall was 50°-85° C. In the course of the distillation, substantial deposition deposition on the glass wall took place, closing virtually the entire tube cross-section in the region of the evaporator exit.

COMPARATIVE EXAMPLE 3

The water-in-oil polymer emulsion C was concentrated by letting down the heated emulsion. Several cycles were required, in each of which the emulsion was heated to 75°-100° C. and then brought to a pressure of from 25 to 45 mbar. The resulting shear stresses led to coagulation and sticking.

COMPARATIVE EXAMPLE 4

The water-in-oil polymer emulsion C was initially taken in a flask equipped with an anchor stirrer and an ascending condenser. Azeotropic distillation was carried out under 45 mbar and at 48° C. This method, too, did not give the desired result because polymer was deposited between the container wall and stirrer, so that the polymer emulsion could no longer be stirred.

COMPARATIVE EXAMPLE 5

The water-in-oil polymer emulsion C was distilled in a still with an external heat exchanger. To ensure a better transfer of heat, the emulsion was pumped through an external heat exchanger whose wall temperature had been brought to 50°–75° C. and in which a pressure of from 20 to 40 mbar was maintained. Coagulation resulted in blockage of both the heat exchanger and the pump.

We claim:

1. A process for the preparation of a concentrated, stable water-in-oil emulsion of a water-soluble or water-swellable polymer by polymerization of one or more water-soluble ethylenically unsaturated monomers in a water-in-oil emulsion and removal of water from the water-in-oil polymer emulsion by azeotropic distillation, wherein the water is removed azeotropically from the water-in-oil polymer emulsion by passing in superheated vapor of an inert organic solvent which is immiscible with water.

2. A process as claimed in claim 1, wherein the temperature of the superheated solvent vapor is 50°–200° C. above the boiling point of the solvent under atmospheric pressure.

3. A process as claimed in claim 1, wherein superheated vapor of hydrocarbons having a boiling range of from 100° to 300° C. at atmospheric pressure is passed into the water-in-oil polymer emulsion in order to effect azeotropic removal of water.

4. A process as claimed in claim 1, wherein water is removed azeotropically from a concentrated water-in-oil polymer emulsion having a polymer content of from 40 to 75% by weight and a water content of less than 10% by weight, the percentages in each case being based on the total emulsion.

5. A process as claimed in claim 1, wherein, before the azeotropic distillation, the amount of the oil phase of the water-in-oil polymer emulsion is increased by the addition of an inert organic solvent.

6. A process as claimed in claim 1, wherein a wetting agent is already present in the water-in-oil polymer emulsion before the azeotropic removal of water, so that the said emulsion is self-inverting when poured into water.

7. A process as claimed in claim 1, wherein a wetting agent is added after the azeotropic removal of water, so that the content of wetting agent in the concentrated water-in-oil polymer emulsion is from 1 to 10% by weight.

8. A process as claimed in claim 1, wherein the azeotropic removal of water is carried out under reduced pressure.

* * * * *